United States Patent [19]

Lattery

[11] Patent Number: 5,749,521

[45] Date of Patent: May 12, 1998

[54] MOISTURE SENSING ELECTRONIC IRRIGATION CONTROL

[75] Inventor: Jerome E. Lattery, Albuquerque, N. Mex.

[73] Assignee: Lore Parker, Albuquerque, N. Mex.

[21] Appl. No.: 651,740

[22] Filed: May 22, 1996

[51] Int. Cl.$^6$ .................. B05B 12/12; A01G 25/16
[52] U.S. Cl. .................. 239/64; 137/78.3; 239/69; 405/37
[58] Field of Search .................. 405/37, 36, 52; 137/78.3; 239/63, 64, 67, 68; 47/1.01 R; 340/604; 324/664

[56] References Cited

U.S. PATENT DOCUMENTS

| | | | |
|---|---|---|---|
| 2,611,643 | 9/1952 | Higgins | 47/1.01 R |
| 2,768,028 | 10/1956 | Robinson | 239/63 X |
| 3,626,286 | 12/1971 | Rauchwerger | 239/63 X |
| 4,197,866 | 4/1980 | Neal | 239/63 X |
| 4,657,039 | 4/1987 | Bireley et al. | 137/78.3 |
| 4,936,333 | 6/1990 | Bireley | 137/78.3 |

FOREIGN PATENT DOCUMENTS 1556595  4/1990  U.S.S.R. ................. 239/64

*Primary Examiner*—Dennis L. Taylor

[57] ABSTRACT

An apparatus for soil irrigation control comprising a control unit, a soil probe, and a temperature probe. The function of the invention is to provide day-to-day soil moisture measurement and control of the irrigation system it is attached to, usually a timer operated system. During operation, the control circuitry periodically measures the apparent electrical resistance between the two electrodes of the soil probe. A signal related to the measured resistance is then compared to a reference set by the user and functions to close or open an electrical switch that ultimately controls the application of irrigation water. The apparatus has a temperature sensor to compensate for effects upon the moisture sensor due to changes in soil temperature, and to also suspend irrigation when freezing conditions are pending. The apparatus also detects the presence of a external timer signal and sustains irrigation through completion of the timer cycle even though the moisture sensor may become wetted during the cycle. The apparatus is capable of a wide range of adjustment to accommodate soils having vastly different characteristics and moisture content, attained by having a novel logarithmic current pulse generator.

5 Claims, 4 Drawing Sheets

MOISTURE SENSING ELECTRONIC IRRIGATION CONTROL

REFERENCES CITED

U.S. PATENT DOCUMENTS
U.S. Pat. No. 4,684,920 August 1987 Reiter 340/310
U.S. Pat. No. 4,693,419 September 1987 Weintraub 239/63
U.S. Pat. No. 4,718,446 January 1988 Simpson 137/78.3
U.S. Pat. No. 4,796,654 January 1989 Simpson 137/78.3
U.S. Pat. No. 4,801,865 January 1989 Miller et al. 324/65
U.S. Pat. No. 4,838,296 June 1989 Brooks 137/78.3
U.S. Pat. No. 4,852,802 August 1989 Iggulden et al. 239/64
U.S. Pat. No. 4,952,868 August 1990 Scherer, III 324/664
U.S. Pat. No. 5,060,859 October 1991 Bancroft 239/64
U.S. Pat. No. 5,179,347 January 1993 Hawkins 324/696
U.S. Pat. No. 5,430,384 July 1995 Hocker 324/694
U.S. Pat. No. 5,445,176 August 1995 Goff 137/80

Other Documents

American Institute of Physics Handbook, Third edition, D. E. Gray, 1972

FIELD OF INVENTION

This invention relates to apparatus for automatic control of the application of irrigation water to agricultural and landscape tracts or industrial media.

BACKGROUND OF THE INVENTION

The apparatus for soil irrigation control consists of a soil moisture sensing means and a means in the form of an electrical switch for exercising control over the irrigation system to which the apparatus would be attached. The apparatus described herein combines these elements in a novel and non-obvious manner. The apparatus also has a temperature sensor means that effectively compensates the moisture sensor for changes in electrical properties of the soil due to changing soil temperature. The temperature sensor means further senses temperatures near freezing and causes a cessation of irrigation when such a temperature exists. The apparatus also incorporates an electronic means for detecting the presence of an external timer signal and sustaining irrigation through completion of the timer cycle even though the moisture sensor may become wetted during the cycle. This combination of operating characteristics is novel.

The described invention does not make an absolute determination of soil moisture content, such as percentage of saturation or capillary tension. Instead, it measures against a preferred setting established by the operator, referred to herein as the set point. The function of the described invention is to provide day-to-day soil moisture measurement and control of the irrigation system it is attached to. It is capable of a wide range of adjustment to accommodate soils having vastly different characteristics and moisture content, attained by having a novel current pulse generator.

The apparatus comprises a control unit, a soil probe, and a temperature probe. The control unit consists of a cooperative arrangement of electronic components including integrated circuits, resistors, capacitors, diodes, switches, and other components; collectively referred to as the control circuitry, housed in a small cabinet. The soil probe consists of a nonconductive support upon which two corrosion resistant electrodes are attached and connected to the control circuitry by an electrical cable. The soil probe functions when buried in the soil at a location typical of the area over which irrigation control is desired. The temperature probe consists of a temperature sensitive thermistor element encased in a protective sleeve and connected to the control circuitry by an electrical cable.

During operation, the control circuitry periodically measures the apparent electrical resistance between the two electrodes of the soil probe. A signal related to the measured resistance is then used to close or open an electrical switch that ultimately controls the application of irrigation water. The temperature sensor measures the temperature of either the air at the soil surface or of the soil itself, depending upon the location at which it is installed. The signal voltage from the temperature sensor is translated by the control circuitry to a correction upon the reference to which the voltage indicative of apparent electrical resistance of the soil is compared.

The apparatus is designed to perform an accurate measurement based on electrical resistivity within a soil medium. The soil medium is regarded as a complicated electrolyte in which there are a number of ion producing species in solution. Common species are salts, acids, and minerals. The measured quantity is basically the apparent resistance of the electrolyte, or its reciprocal apparent conductance, in an electrolyte of uncertain composition and concentration.

Three important properties of the soil medium as an electrolyte have been recognized in the invention described herein that have been either unknown in prior art, or have not been effectively taken into consideration in prior art inventions:

First, there exists at the contact between a conductive electrode and an electrolyte an electrochemical potential. This potential causes errors in the determination of apparent resistance by creating a departure from direct proportionality between applied voltage and current flow in electrical circuits of the kind commonly used to measure apparent resistance. Furthermore, the contact potential changes with time during the flow of electrical current due to chemical reactions occuring at the surface of the electrodes. The use of constant current electrical measurements in this invention overcomes the electrochemical potential at the contact between electrodes and the soil medium, and produces measurement of the bulk apparent resistivity of the soil medium.

Second, chemical activity due to electrical current passing through an electrolyte is directly proportional to the time integral of electrical current, and not necessarily proportional to the applied voltage of the source of current. This principal is well known in electrochemistry. The non-obvious application of this principal in this invention is to use brief and small amplitude reversing current pulses to cancel and neutralize chemical activity to the greatest practical extent. This is not the same as the simple use of a continuous alternating current, the use of which can cause electrochemical alteration of the medium and corrosion of the electrodes if there is any lack of symmetry in the electrical waveform or any inhomogeneity in the soil medium.

Third, the apparent resistance of an electrolyte, which the soil medium is assumed to be, decreases with increasing temperature in a very significant manner, due primarily to increasing ion mobility with increasing temperature. In reference literature on electrolytic apparent resistivity the effect is typically estimated at about 2 percent per degree Celcius, nearly independent of the species of ions. The effect of this 2 percent per degree change would be a total change of resistivity by a factor of 1.49 over the temperature range of from 15 to 35 degrees Celcius. During development of the invention described herein measurements were made of the apparent resistivity of sandy clay soil of constant moisture content over this same range of temperatures. These measurements revealed an decrease in apparent resistivity by a factor of 1.55 over the same temperature range of from 15 to 35 degrees Celcius. This result is very similar to the effect estimated in the literature, and appears to verify the nature of electrical resistivity of the soil medium. In view of an expected change in apparent resistivity of soil due to evaporation and transpiration, typically 10 percent per day, a change in soil temperature of only 5 degrees Celcius could conceal the change of resistivity due to water loss for an entire day if there were no correction for temperature. The invention described herein includes a temperature sensor and electronic means within the control circuitry for correcting the effect of temperature change on the measurement of soil apparent resistivity.

The invention described herein uses a moisture probe having the conductive electrodes in direct contact with the soil medium in which the moisture measurement is to be made. There is no dependence on the transfer of moisture into or out of a second medium, as would be the case where electrodes are surrounded by a second material, such as gypsum. The probe has a geometry that facilitates the passage of electrical current through the soil medium between the electrodes. The physical dimensions are sufficiently large to span over the diameters of soil particles and voids, thus averaging the contact of electrode and soil over a useful area. The probe is constructed of materials that resist deterioration when buried in soil for prolonged periods of time.

The control unit part of the invention is embodied in a weather proof housing with connection terminals and operator controls conveniently arranged on a front panel.

The manner of operation is as follows: The operator first provides irrigation as necessary to the area over which control is desired, and within which the moisture probe is buried, to establish the desirable amount of soil moisture. The operator then adjusts the moisture set control, while depressing the push to set pushbutton switch control, to the point where the ready indicator lamp changes from dark to lighted. Having been so adjusted, the apparatus will provide a closed electrical circuit path between the user terminals when the soil is dryer than the condition existing at the time of the adjusting. Similarly, the apparatus will open the circuit path between the user terminals when the soil is more moist than the condition existing at the time of the adjusting.

PRIOR ART

U.S. Pat. No. 4,684,920 discloses a control system utilizing a remote sensor and relay logic to either include or bypass the remote sensor as the irrigation control element. The system operates the sensors, furnished by others, on alternating current.

U.S. Pat. No. 4,693,419 discloses a system that controls irrigation valves on the basis of soil moisture measurement. The sensor consists of spoon-like metallic electrodes buried in the soil and connected to a simple alternating current bridge circuit. There is no provision for temperature compensation of the measurements. The control circuit is not electrically isolated from the moisture measurement circuit.

U.S. Pat. Nos. 4,718,446 and 4,796,654 disclose systems that sense soil moisture and control an irrigation valve by means of a relay. The two electrode sensor probe is connected as a series element in the gate input circuit of a TRIAC device. There is no disclosed means for temperature compensation of the soil moisture measurement.

U.S. Pat. No. 4,838,296 discloses a moisture sensing switch for controlling a water valve. It utilizes a ceramic block variable resistance soil moisture sensor. The sensor operates on alternating current. There is no disclosed means for temperature compensation.

U.S. Pat. No. 4,852,802 discloses an automated irrigation system having numerous sprinkler heads and devices for controlling irrigation and the application of fertilizers. The soil moisture sensor has two electrodes, but no means is disclosed for performing an actual electrical measurement. No means for temperature compensation of the soil moisture measurement is disclosed.

U.S. Pat. No. 4,952,868 discloses a moisture sensing system emphasizing construction of a particular sensor probe. The sensor operates on direct current, and is a variable resistance device, although it is oddly described as a capacitor whose resistance varies with soil moisture. The device senses moisture and exercises control of the irrigation valve it is installed adjacent to.

U.S. Pat. No. 5,060,859 discloses a system for controlling irrigation based on electrical resistivity of a soil moisture sensor. The disclosed system utilizes direct current through the sensor, and utilizes two sensing bodies having dissimilar porous ceramic elements.

U.S. Pat. No. 5,430,384 discloses an electrical temperature correction for the change of apparent electrical resistance of a soil moisture probe with temperature. The apparatus described is specific to a particular type of probe, typified by an Irrometer Watermark #200-10. The electrical circuit creates a half-bridge consisting of the disclosed resistor and thermistor network and the resistance of the soil moisture probe. The apparatus of the invention described herein differs significantly by performing an independent direct measurement of temperature, which is subsequently translated into a correction by the electronic control circuitry.

U.S. Pat. No. 5,430,384 further teaches the use of brief DC voltage pulses generated by digital electronic means to operate a resistive soil probe. Although it is mentioned that the use of alternating current in the soil moisture probe would be desirable as an alternative embodiment, there is no disclosed means for creating such an AC voltage.

U.S. Pat. No. 5,445,176 discloses a valve control having a remote sensor unit. The apparatus utilizes direct current through the soil moisture probe. Temperature compensation is mentioned only as an alternative embodiment, and would be applied in a different manner than in the invention disclosed herein.

Comparison With Prior Art

The invention described herein makes use of brief electrical pulses in which the current magnitude is the independent variable, rather than the applied voltage, as customary in electrical measurements of resistance. This concept is not found in prior art. The current magnitude is established by a well known electrical circuit, known as a voltage controlled current source. Furthermore, the current magnitude is approximately exponential as a function of the control voltage, a property attained by novel combination of the voltage controlled current source with a diode and resistor network having an approximately logarithmic voltage versus current relationship. The diode and resistor network for creating an approximate logarithmic relationship between voltage and current is also a well known electrical circuit, but has not applied to soil moisture sensing in prior art. The wide range current source enables the apparatus to be adjusted for soil conditions having apparent resistivities ranging over a factor of one hundred to one. This adjustment range is not found in prior art.

Prior art contains no reference to pulsed operation of resistive soil moisture probe whereby there is a single small amplitude monopolar current pulse followed immediately by an identical pulse of opposite polarity.

The means for measuring the apparent electrical resistance of a soil moisture probe in prior art devices is a voltage divider or bridge circuit in which the soil probe is regarded as a simple variable resistor, with an electronic device comparing the measured value with a fixed, although adjustable, reference value. There is no reference in prior art to the use of a comparator reference having a continuous correction for temperature in the manner disclosed in the present invention.

The soil moisture sensor described in this invention differs from those of prior art. The physical dimensions are such that the electrodes and the space between them are large compared with the soil pore or grain size in the soil. The electrodes are flush with the outer surface of the probe body to promote sustained contact with the soil medium. The sensor may be easily implaced in the soil without concern over the spacing between the two electrodes, as would be the case where the electrodes are separate pieces. The spacing between electrodes of the moisture sensor of the present invention does not require adjustment because it is unnecessary to relocate the electrodes with respect to each other to effect a particular apparent electrical resistance between them. The control circuitry is capable of accurately measuring apparent electrical resistance between the electrodes for any practical soil medium.

DESCRIPTION OF INVENTION

Figure 1:
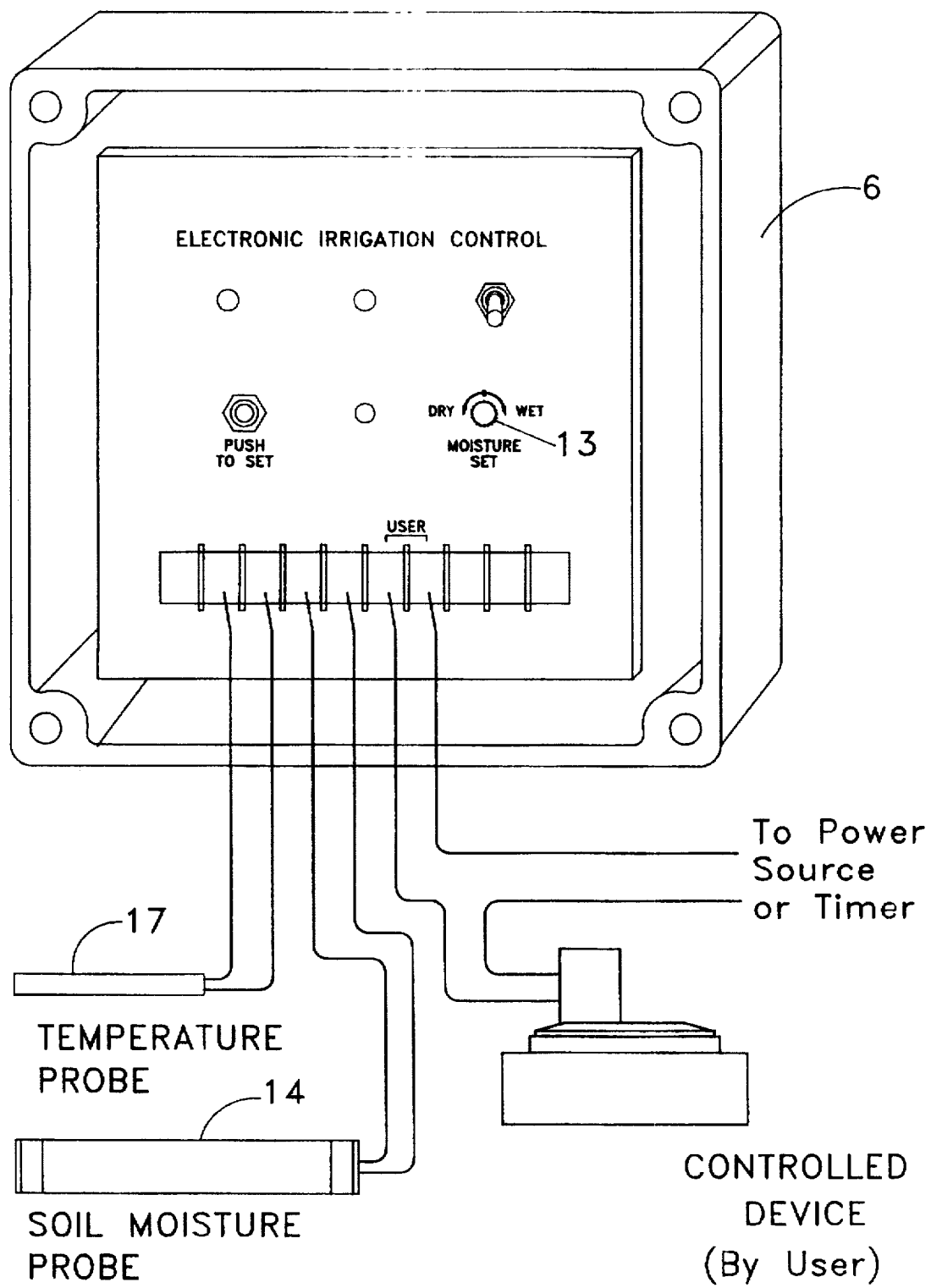
FIG. 1 is a simplified illustration of the preferred embodiment of the apparatus of the present invention.

Referring to FIG. 1, in the preferred embodiment the invention consists of the control circuitry housed in a rectangular weather proof enclosure 6, a soil moisture probe 14, and temperature probe 17. The soil moisture probe and the temperature probe connect to the control unit. Other connections are to devices provided by the user, typically a clock or timer and irrigation valves.

Figure 2:
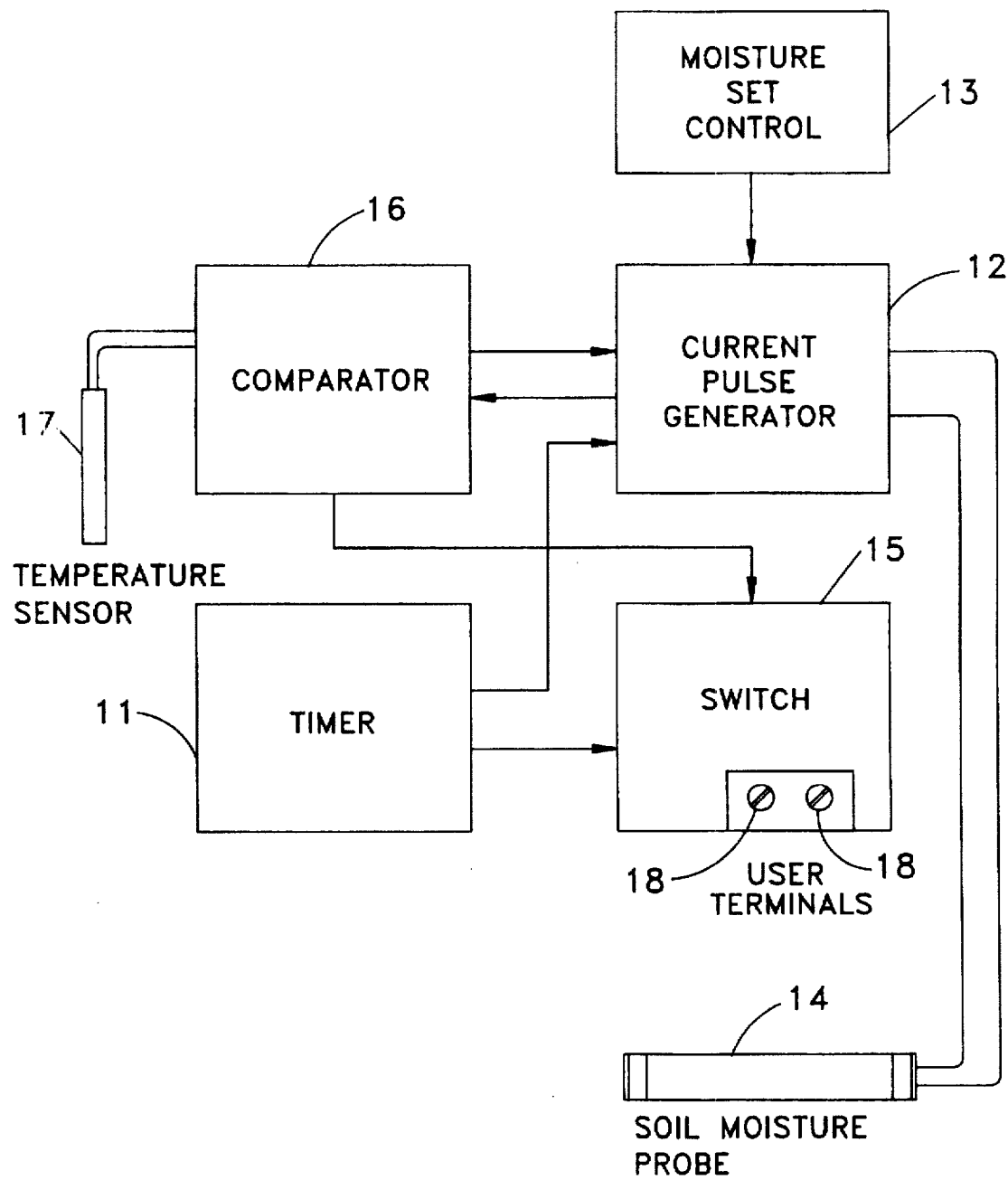
FIG. 2 is block circuit diagram of the present invention.

Referring to FIG. 2, detailed operation of the invention is as follows. The measurement of soil moisture is accomplished by measuring the voltage potential difference that occurs between the two electrodes of the soil probe 14 when a pulse of current passes from one electrode to the other through the surrounding soil (not shown). The pulse, although brief, is maintained at a constant current magnitude during the time it is on, regardless of the apparent electrical resistance of the soil. The voltage potential difference that can occur is limited only by the voltage supply of the circuit elements that produce the pulse. The magnitude of the current pulse is established by the setting of the user moisture set control 13.

The apparatus internal electronic circuitry is made up of several functional circuit blocks that act together to generate electrical pulses to the soil probe 14 and to create a response to the resulting voltages. These functional blocks include the timer 11, the current pulse generator 12, the comparator 16, and the valve switch 15.

Figure 3:
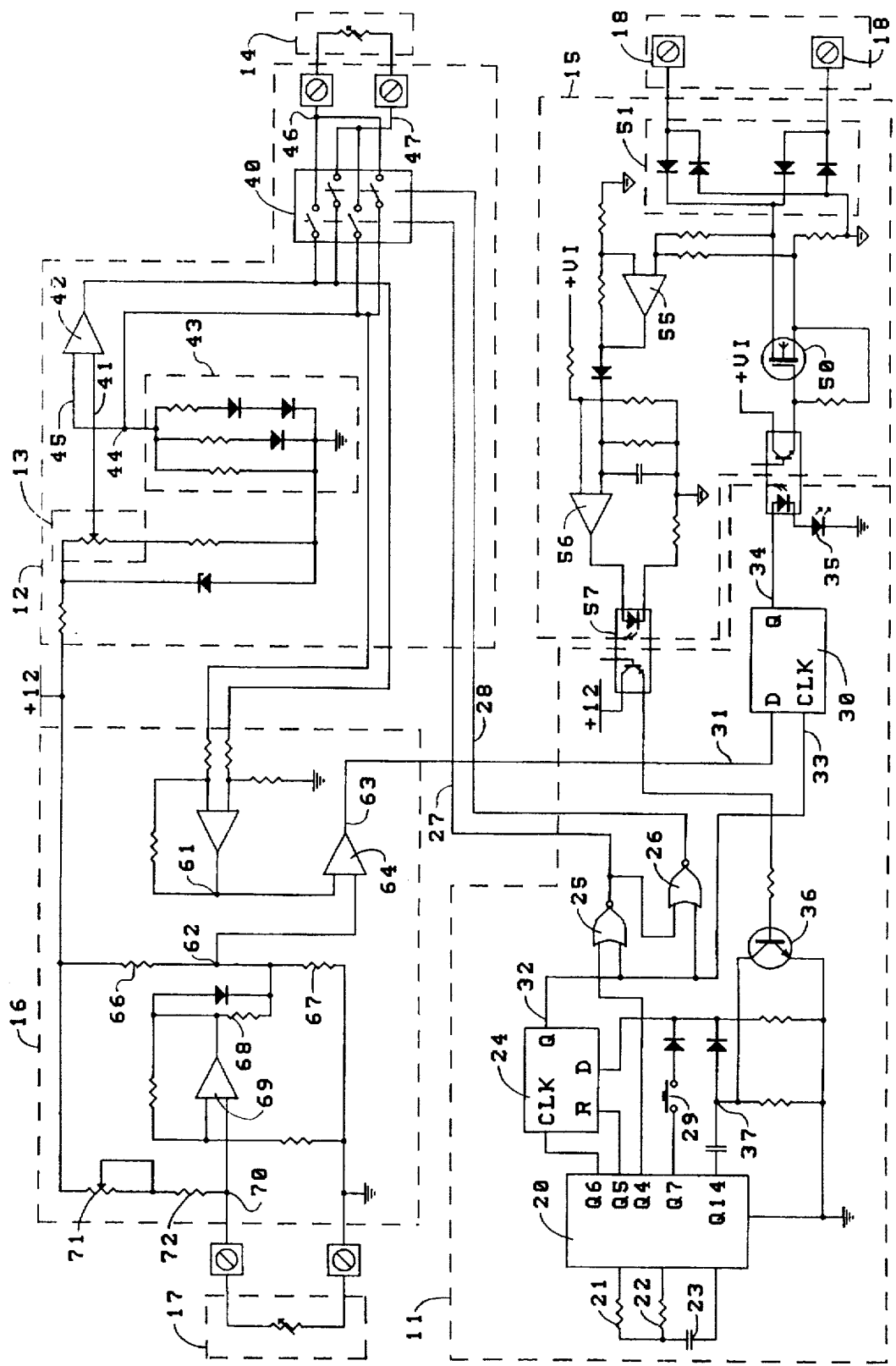
FIG. 3 is a schematic circuit diagram of the control circuitry.

Referring to FIG. 3, detailed operation of each of the functional blocks is as follows.

The timer 11 is based on an integrated circuit timer 20, which contains an oscillator and multi-stage binary counter. The oscillator runs at a frequency determined by the resistors 21 and 22, and capacitor 23. This frequency is internally divided by two in successive stages, and appears at several outputs. These outputs logically control a resettable type D flip flop 24 and logic gates 25 and 26, producing at the output line 27 of gate 25 a positive pulse of 0.0167 seconds duration every 32 seconds. This is followed immediately by a similar positive pulse of the same duration at output line 28 of gate 26. The pulses on lines 27 and 28 control the integrated circuit switch 40, causing it to become conductive during the duration of a control pulse, and, in turn, control the passage of electrical current from the current generator circuit 12 through the soil probe 14. If an operator depresses push button switch 29, the pulses on lines 27 and 28 are caused to repeat at the accelerated rate of 4 per second, instead of the rate of one every 32 seconds. This accelerated rate is convenient to the operator when setting the moisture set control 13.

The current pulse generator circuit 12 causes a measured flow of electrical current through the soil probe 14 during the times elements of switch 40 are in a conductive state, first in one direction through soil probe 14, then in the reverse direction. The magnitude of the current is determined by the voltage applied to the noninverting input 41 of operational amplifier 42 from moisture set control 13. Current flows from the output of operational amplifier 42, through one element of switch 40, through soil probe 14, through another element of switch 40, and to circuit ground through network 43. During conduction the operational amplifier 42 passes such a current as to create a voltage drop across network 43 equal to the voltage at noninverting input 41. Within network 43 there is an approximately logarithmic relationship between the current flow into connection point 44 to ground and the voltage developed at connection point 44 and at the inverting input 45 of operational amplifier 42. The magnitude of current pulse through the soil probe 14 is thus approximately exponentially related to the setting of the moisture set control 13. In the present embodiment the current magnitude is 0.1 milliamperes when the moisture set control 13 is set at minimum, the current magnitude is 1.0 milliamperes when the moisture set control 13 is set at midrange, and the current magnitude is 10 milliamperes when the moisture set control 13 is set at maximum. The direction of the current flow between the electrodes of soil probe 14 is determined by which of the two lines 27, or 28, has a positive pulse. When the line 27 has a positive pulse, current enters the soil probe 14 at 46 and returns at 47. When the line 28 has a positive pulse, current enters the soil probe 14 at 47 and returns at 46. During the times between current pulses, the lines 27 and 28 are both at ground voltage, all elements of switch 40 are nonconductive, and there is no current through soil probe 14.

Comparator circuit 16 compares the soil probe voltage at 61, which is proportional to the voltage potential difference that occurs between the two electrodes of the soil probe 14 when a pulse of current passes from one electrode to the other through the surrounding soil, to a reference voltage at 62. When the soil probe voltage at 61 exceeds the reference voltage at 62 the output 63 of comparator amplifier output 64 goes to a high state. When the soil probe voltage at 61 is less than the reference voltage at 62 the output of the comparator amplifier 64 goes to a low state. The output of comparator amplifier 64 is applied to the D input 31 of flip flop 30. At the conclusion of the current pulse the rise of the output 32 of flip flop 24 clocks the clock input 33 of flip flop 30, causing the output 34 of flip flop 30 to a high state if input 31 is high; or to a low state if input 31 is low. The reference voltage voltage at 62 results from the combining of a fixed voltage from the divider formed by resistors 66 and 67 with a voltage output 68 of operational amplifier 69. The operational amplifier 69 amplifies the voltage produced at 70 by the voltage divider consisting of resistors 71, 72, and the resistance of temperature probe 17, a thermistor device. The variation of voltage at 70 with temperature causes the voltage at 62 to change with temperature with the same trend as the change of soil probe voltage at 61 with temperature. This changes the reference voltage at 62 to counteract the effect of temperature upon soil probe voltage at 61, leaving only the effect of soil moisture upon the soil probe voltage at 61. When the temperature of temperature probe 17 approaches freezing, the reference voltage at 62 becomes so large that the soil probe voltage at 61 cannot be larger, regardless of soil moisture conditions, and the output of comparator amplifier 64 will always be low. This condition would cause switch circuit 15 to open the circuit between the user terminals 18 and suspend irrigation when freezing conditions are pending.

Switch circuit 15 controls the user irrigation system by causing there to be either a conductive condition between the user terminals 18 if the soil moisture is dryer than the set point, or a nonconductive condition if the soil moisture is greater than the set point. The conductive condition between the user terminals 18 terminals is controlled indirectly by the output 34 of flip flop 30. When output 34 of flip flop 30 is at a high state, current flows through the optical coupler and ready indicator lamp 35, and transistor 50 is driven to a conductive condition. When transistor 50 is in a conductive condition there is a conductive condition between user terminals 18. Since transistor 50 is a direct current device and the current being switched is usually alternating current, diode bridge rectifier 51 provides the necessary rectification.

When there is a voltage present between the user terminals 18, indicative of a signal from a external user device, such as an irrigation timer, not shown, the control circuitry will suspend the periodic measurement of soil moisture. Switch circuit 15 will remain in the state existing at the time the voltage at user terminals 18 became present until the voltage is removed. The reason for this functionality is to prevent the interruption of irrigation that would occur if the soil in which the moisture probe is located should become wetted during the timed application of irrigation. The presence of a voltage between user terminals 18 is sensed by operational amplifiers 55 and 56. When the voltage is sufficient, the output of operational amplifier 56 operates optical coupler 57, which causes transistor 36 to become conductive. When transistor 36 is conductive the periodic pulses at 37 are absorbed, there is no soil moisture sampling, and switch circuit 15 remains in an unchanged state.

Figure 4:
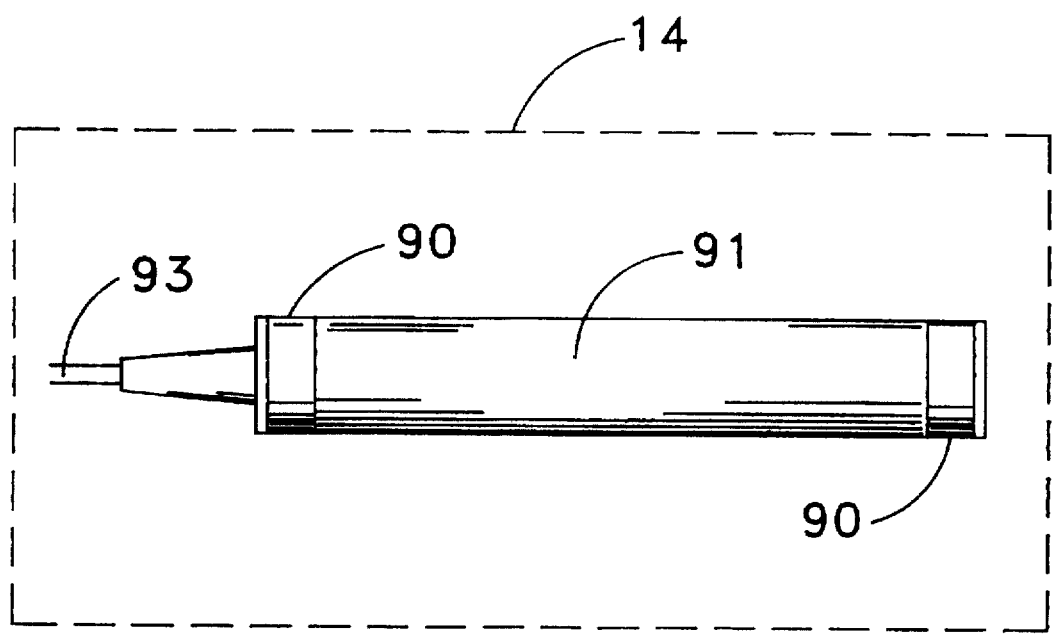
FIG. 4 is a simplified drawing of the soil moisture probe.

Referring to FIG. 4, the soil moisture probe 14 consists of two cylindrical corrosion resistant conductive electrodes 90 in the form of bands encircling a tubular nonconductive support 91. The electrical connection to the control unit is by the two conductor cable 93, with each of the conductive electrodes 90 being connected to one of the conductors of cable 93. The soil probe is disposed beneath the surface of the soil, not shown, at a location and depth convenient to the user.

Although the above description contains many specific descriptions of arrangements of components to attain the described functionality, these should not be construed as limitations on the scope of the invention, but rather as the exemplification of one preferred embodiment of it. Many other variations are possible, for example, the use of an optically coupled TRIAC device in place of the transistor 50 and diode bridge 51 as the main element of the switch circuit 15, or different arrangements of electronic integrated circuits and other components to effectuate the function of each of the major circuit functional blocks. Another embodiment could combine the functions of the several circuit functional blocks into large scale integrated circuits or microprocessor devices. Accordingly, the scope of the invention should be determined not by the specific embodiment described, but by the appended claims.

What is claimed is:

1. An apparatus for comparing the amount of moisture in soil with a reference setting and controlling the application of irrigation water, comprising:

an electronic means for generating periodic electrical current pulses that pass through the soil between two conductive electrodes fixed upon a nonconductive support and disposed beneath the surface of the soil, said electrical current being in the form of a unipolar pulse of the briefest practical duration followed immediately by a unipolar pulse of the same duration and current amplitude having opposite polarity, an electronic comparator means that compares the voltage potential difference produced by said electrical current pulses between said conductive electrodes with a voltage potential expressing a reference setting, an electronic sensor means for measuring temperature of the air or soil and applying a correction to said voltage potential that expresses said reference setting, equal to the effect from change with temperature of the apparent electrical resistance in the soil medium, an electronic switching means that completes an electrical circuit for electrically controlled irrigation valves when the voltage potential difference produced by said electrical current between said conductive electrodes exceeds said voltage potential expressing the reference setting, and an electronic means that detects the presence of an external control signal and that causes cessation of said periodic electrical current pulses during the presence of said external control signal.

2. An apparatus for measuring the amount of moisture in soil and controlling the application of irrigation water comprising a cooperative arrangement of electronic components, that generate periodic electrical current pulses in the form of a unipolar pulse of the briefest practical duration followed immediately by a unipolar pulse of the same duration and current amplitude having opposite polarity, that pass between two conductive electrodes, disposed beneath the surface of said soil, that compare the voltage potential difference produced by said electrical current pulses between said conductive electrodes with a voltage potential expressing a reference setting, that measure the temperature of the air or soil and apply a correction to said voltage potential that expresses said reference setting, equal to the effect from change with temperature of the apparent electrical resistance the soil medium, that complete an electrical circuit path for an external electrical circuit, that detect the presence of an external control signal and that cause cessation of said periodic electrical current pulses during the presence of said external control signal.

3. The apparatus of claim 1 further comprising; a weather proof housing that encloses the several electronic means and, a control panel that supports the electrical controls and connection points at locations convenient to the user.

4. The apparatus of claim 1 wherein the electronic sensor means for measuring temperature is a thermistor device disposed in the soil near to the soil moisture probe.

5. The apparatus of claim 1 wherein the electronic sensor means for measuring temperature is a thermistor device disposed in the air at a place typifying the outdoor ground surface temperature of the area over which irrigation control is intended.

* * * * *